United States Patent Office 3,207,760
Patented Sept. 21, 1965

3,207,760
S-(2-PYRIDYL-1-OXIDE)-THIOARYLATES
Bernard B. Brown, Westfield, N.J., assignor to S. B. Penick & Company, New York, N.Y., a corporation of Delaware
No Drawing. Filed Apr. 10, 1962, Ser. No. 186,333
2 Claims. (Cl. 260—294.8)

This invention relates to certain novel pyridine-1-oxide derivatives. More particularly it relates to certain useful 2-thioarylates of pridine-1-oxide and a process for making these novel compounds.

This invention according to its compositional aspects includes the compounds of the formula:

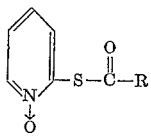

where R is chosen from the group of substituted and unsubstituted aryl radicals. When R is a substituted aryl radical having the formula:

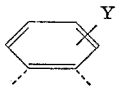

Y represents nuclear substituents on the aryl ring, each chosen from the group consisting of lower alkyl, lower alkoxy, halo and nitro radicals.

The term "lower" when used herein with respect to alkyl and alkoxy refers to such radicals having less than 5 carbon atoms.

represents aryl rings.

According to its process aspects, this invention encompasses the reaction of 2-mercaptopyridine-1-oxide and its salts with the appropriate aroyl halide. The reaction with the mercaptopyridine-1-oxide may be carried out in the presence of a halo-acid-acceptor.

Among the aroyl halides useful for preparing the novel substituted thioarylates of this invention are those represented by the formula:

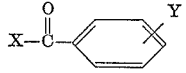

where X may be chlorine or bromide and Y is as mentioned above.

The starting material for this process, 2-mercaptopyridine-1-oxide is described in U.S. Patent 2,686,786 issued August 17, 1954. Methods for the synthesis of this material are therein disclosed.

Among the acid-accepting reagents useful for promoting the reaction of the 2-mercaptopyridine-1-oxide with the aroyl halides are pyridine, the picolines, dimethylaniline and the alkali metal and alkaline earth hydroxides. Any inert solvent, the organic acid-acceptors or mixtures of solvent and acceptors may serve as the reaction medium.

Alternately, an aqueous solution of the metal salts, preferably the alkali metal or alkaline earth salts of 2-mercaptopyridine-1-oxide can be directly reacted with acylating agent even in the absence of acid acceptors or organic solvents.

Among the substituted benzoyl and naphthoyl-acylating halides, the acid chlorides are the preferred halides. Among these, some that are useful for preparing the novel thioarylates of this reaction are benzoyl and naphthyol chlorides for preparing the nuclear unsubstituted compounds. The substituted compounds are prepared from such acid chlorides as 2-methyl-benzoyl chloride, 2,5-dichlorobenzoyl chloride, 3,5-dinitrobenzoyl chloride, 3-methoxybenzoyl chloride, 4-nitrobenzoyl chloride, 4-ethoxybenzoyl chloride, 3-isopropylbenzoyl chloride. Those acylating reactants are all known and many may be purchased. The synthesis of the others is routine by methods described in the literature.

Both reactants are used in equimolar quantities but a slight excess (10%) of the acylating agent is preferred. The reaction will proceed in good yield under simple laboratory conditions. Occasionally, these benzoyl halides, having alkyl substituents at both the 2 and 6 positions, especially those with longer alkyl chains, will not give good yields under simple conditions due to steric hindrance. To prepare substituted thiobenzoates of 2-pyridyl-1-oxides where the substituents are on the 2- and 6-positions it is preferred to react 2-chloropyridine-1-oxide with a metallic monothiobenzoate such as silver monothio-nuclear substituted-benzoates.

This type-reaction can be used to prepare all the other S-(2-pyridyl-1-oxide) thioarylates of this invention, but the preparation of the metallic monothiobenzoate starting materials are cumbersome and expensive.

The compounds of this invention possess good antibacterial qualities. Against *M. pyrogenes* var. *aureus* and *M. flavus* #10240 ATCC, some of the novel compounds of this invention have the same order of activity on a weight basis as the antibiotics, Neomycin and Bacitracin. In addition against *Monolinia fructicola*, (by the Spore Germination Test Tube Dilution Procedure) certain of the novel compounds of this invention demostrated an $ED_{50-85}$ at concentrations of 0.25 part per million. When tested against "tomato early blight" in the greenhouse on growing plants, better than 95% control was achieved with 500 parts per million of S-(2-pyridyl-1-oxide)-3,5-dinitrothiobenzoate (Melting Point 133–134° centigrade), and 85% control with the same concentration of S-(2 - pyridyl - 1-oxide)-2,5-dichlorothiobenzoate (Melting Point 135–136.5° centigrade). The "blight" control was achieved without signs of phytotoxicity or alteration in either the growth pattern or fruit quality. This is in contrast with the known aralkyl thioesters of 2-pyridyl-1-oxide which are phytotoxic (cf. U.S. Patent 2,922,792 where they are disclosed as herbicides).

This invention will be illustrated by the following examples which, while showing preferred modes of preparing representative compounds within the broad ambit of this invention, are not to be construed as limiting. Appropriate changes in reaction conditions and recovery procedures may be made in the manner normally employed by those possessing the usual skill of this art. By appropriate changes in the starting materials the other compounds within the scope of this invention may also be prepared.

EXAMPLE ONE

S-(2-pyridyl-1-oxide)-thiobenzoate

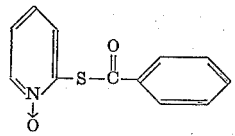

Add 0.1 mole of 2-mercaptopyridine-1-oxide and 0.1 mole of pyridine to 300 milliliters of dry benzene. Cool the mixture to 5–10° centigrade. Dropwise, add a solution of 0.11 mole of benzoyl chloride in dry ether to the cooled mixture. Maintain agitation and cooling during the period of addition to break up the solid product that forms. When the addition is completed heat the slurry to about 55° centigrade and maintain the temperature and agitation for about 2 hours. Cool and filter the reaction mixture and wash the precipitate with cold benzene. Slurry the precipitate in a cold solution of 3% sodium bicarbonate in water to remove the excess benzoyl chloride. Filter the residue and wash it with cold water. The residue is then recrystallized from acetone to yield the S-(2-pyridyl-1-oxide)-thiobenzoate.

EXAMPLE TWO

*S-(2-pyridyl-1-oxide)-3,5-dinitrothiobenzoate*

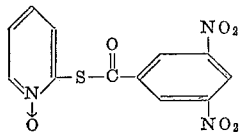

Following the procedure of Example One but substitute 3,5-dinitrobenzoyl chloride for the benzoyl chloride of that example to obtain S-(2-pyridyl-1-oxide)-3,5-dinitrothiobenzoate.

EXAMPLE THREE

*S-(2-pyridyl-1-oxide)-2,5-dichlorothiobenzoate*

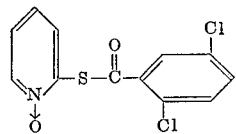

Following the procedure of Example One but substitute 2,5-dichlorobenzoyl chloride for the benzoyl chloride of that example to obtain S-(2-pyridyl-1-oxide)-2,5-dichlorothiobenzoate.

EXAMPLE FOUR

*S-(2-pyridyl-1-oxide)-3,4-dimethylthiobenzoate*

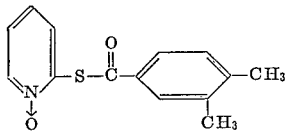

Following the procedure of Example One but substitute 3,4-dimethylbenzoyl chloride for the benzoyl chloride of that example to obtain S-(2-pyridyl-1-oxide)-3,4-dimethylthiobenzoate.

EXAMPLE FIVE

*S-(2-pyridyl-1-oxide)-3 nitro-4 chlorothiobenzoate*

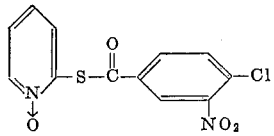

Following the procedure of Example One but substitute 3-nitro-4-chlorobenzoyl chloride for the benzoyl chloride of that example to obtain S-(2-pyridyl-1-oxide)3-nitro-4 chlorothiobenzoate.

EXAMPLE SIX

*S-(2-pyridyl-1-oxide)-thionaphthoate*

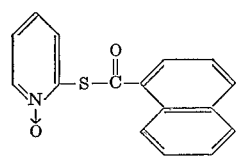

Following the procedure of Example One but substitute 1-naphthol chloride for the chloride of that example to obtain S-(2-pyridyl-1-oxide)-thionaphthoate.

EXAMPLE SEVEN

*S-(2-pyridyl-1-oxide)-3-methylthiobenzoate*

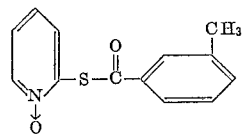

Following the procedure of Example One but substitute 3-methylbenzoyl chloride for the benzoyl chloride of that example to obtain S-(2-pyridyl-1-oxide)-3-methylthiobenzoate.

EXAMPLE EIGHT

*S-(2-pyridyl-1-oxide)-3-methoxythiobenzoate*

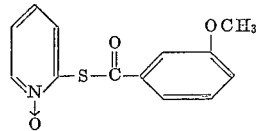

Follow the procedure of Example One but substitute 3-methoxybenzoyl chloride for the benzoyl chloride of that example to obtain S-(2-pyridyl-1-oxide)-3-methoxythiobenzoate.

EXAMPLE NINE

*S-(2-pyridyl-1-oxide)-4-isopropylthiobenzoate*

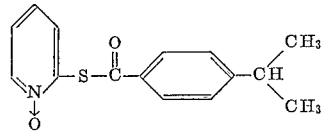

Follow the procedure of Example One but substitute 4-isopropylbenzoyl chloride for the benzoyl chloride of that example to obtain S-(2-pyridyl-1-oxide)-4-isopropylthiobenzoate.

EXAMPLE TEN

*S-(2-pyridyl-1-oxide)-2-chlorothiobenzoate*

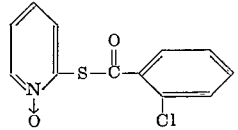

Follow the procedure of Example One but substitute 2-chlorobenzoyl chloride for the benzoyl chloride of that example to obtain S-(2-pyridyl-1-oxide)-2-chlorothiobenzoate.

EXAMPLE ELEVEN

*S-(2-pyridyl-1-oxide)-3-nitrothiobenzoate*

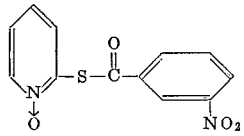

Follow the procedure of Example One but substitute 3-nitrobenzoyl chloride for the benzoyl chloride of that example to obtain S-(2-pyridyl-1-oxide)-3-nitrothiobenzoate.

EXAMPLE TWELVE

*S-(2-pyridyl-1-oxide)3,5-dinitrothiobenzoate*

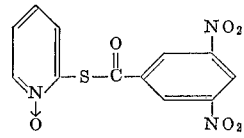

While cooling with an ice-bath, slowly add 0.11 mole of 3,5-dinitrobenzoyl chloride to an aqueous solution of sodio-2-mercaptopyridine - 1 - oxide. Maintain vigorous agitation during the addition. When the addition is completed, remove the ice-bath and continue the stirring for at least an hour. Filter the precipitate and wash it with cold water. Slurry the precipitate in saturated sodium bicarbonate solution to remove the excess of the benzoyl chloride. Refilter the precipitate and wash to remove the bicarbonate. Recrystallize the precipitate from aqueous acetone or aqueous alcohol to recover S-(2-pyridyl-1-oxide)-3,5-dinitrothiobenzoate.

I claim:
1. S-(2-pyridyl-1-oxide)-3,5-dinitrothiobenzoate.
2. S-(2-pyridyl-1-oxide)-3-nitro-chlorothiobenzoate.

References Cited by the Examiner

UNITED STATES PATENTS

| | | | |
|---|---|---|---|
| 2,686,786 | 8/54 | Shaw et al. | 260—294.8 |
| 2,742,393 | 4/56 | Bernstein et al. | 260—294.8 |
| 2,742,476 | 4/56 | Bernstein et al. | 260—294.8 |
| 2,786,847 | 3/57 | Cislak | 260—294.8 |
| 2,809,971 | 10/57 | Bernstein et al | 260—294.8 |
| 2,922,790 | 1/60 | Rockett et al. | 260—294.8 |
| 2,922,791 | 1/60 | Rockett | 260—294.8 |
| 2,922,792 | 1/60 | Rockett | 260—294.8 |
| 2,922,793 | 1/60 | Rockett | 260—294.8 |
| 2,932,647 | 4/60 | Rockett | 260—294.8 |
| 2,940,978 | 6/60 | Brown | 260—294.8 |

OTHER REFERENCES

Bernthsen and Sudborough: "Textbook of Organic Chemistry," 1931 edition, pages 372–81 (Van Nostrand).

Kharasch: "Organic Sulfur Compounds," volume 1, page 422 (1961) (Pergamon Press).

WALTER A. MODANCE, *Primary Examiner.*
IRVING MARCUS, *Examiner.*

UNITED STATES PATENT OFFICE
CERTIFICATE OF CORRECTION

Patent No. 3,207,760            September 21, 1965

Bernard B. Brown

It is hereby certified that error appears in the above numbered patent requiring correction and that the said Letters Patent should read as corrected below.

Column 5, line 11, for "-3-nitro-chlorothiobenzoate" read -- -3-nitro-4-chlorothiobenzoate --.

Signed and sealed this 10th day of January 1967.

(SEAL)
Attest:

ERNEST W. SWIDER
Attesting Officer

EDWARD J. BRENNER
Commissioner of Patents